United States Patent

[11] 3,588,168

| [72] | Inventors | Hans Froitzheim;<br>Karl Letzel; Leo Bsirske, Sindelfingen, Germany |
|---|---|---|
| [21] | Appl. No. | 751,292 |
| [22] | Filed | Aug. 8, 1968 |
| [45] | Patented | June 28, 1971 |
| [73] | Assignee | Daimler-Benz Aktiengesellschaft<br>Stuttgart-Unterturkheim, Germany |
| [32] | Priority | Aug. 8, 1967 |
| [33] | | Germany |
| [31] | | P 16 30 334.7 |

[54] SLEEPING PLACE ARRANGEMENT FOR TRUCKS
17 Claims, 7 Drawing Figs.

[52] U.S. Cl. .................................................. 296/28,
5/118, 105/322
[51] Int. Cl. .................................................. B62d 33/06
[50] Field of Search .................................... 296/28, 28
(.21), 24, 23, 69; 5/9, 118; 105/322

[56] References Cited
UNITED STATES PATENTS
1,835,468  12/1931  Christianson.................  105/322

2,140,968  12/1938  Paranzino.....................  296/24
FOREIGN PATENTS
1,037,730  8/1966  Great Britain.................  296/28
11,713  12/1895  Switzerland..................  105/322
195  12/1887  U.S.S.R.......................  105/322

Primary Examiner—Benjamin Hersh
Assistant Examiner—John A. Pekar
Attorney—Craig, Antonelli, Stewart and Hill ABSTRACT: A sleeping place arrangement for trucks in which cushioned benches which are arranged to the rear of the driver seat and of the assistant driver seat, are preferably mounted at the rear boundary wall of the driver cab and serve as berths; the two benches, arranged one below the other, are pivotally secured along one side thereof at the driver cab with the aid of foldable double hinges and are supported at the opposite side thereof by securing means mounted at the driver cab and selectively holding the benches in the sleeping position or in a position in which the upper bench serves as backrest and the lower bench as seating surface for an additional seat bench.

PATENTED JUN28 1971

INVENTORS
HANS FROITZHEIM
KARL LETZEL
LEO BSIRSKE

BY Craig & Antonelli

ATTORNEYS

PATENTED JUN 28 1971

INVENTORS
HANS FROITZHEIM
KARL LETZEL
LEO BSIRSKE

BY Craig & Antonelli

ATTORNEYS

SLEEPING PLACE ARRANGEMENT FOR TRUCKS

The present invention relates to a sleeping place arrangement for trucks, consisting of cushioned benches provided to the rear of the driver seat and of the assistant driver seat and serving as berths which are preferably mounted at the rear boundary wall of the driver cab.

Such berthing arrangements are known in particular for long distance trailer trucks. Only one sleeping place is thereby generally provided.

The aim underlying the present invention resides in creating a berthing arrangement for two sleeping places which are to be arranged one below the other and are to offer the possibility that they can be converted into a seat bench in order not to require unnecessary space within the driver cab which is already relatively small as such. The legally required minimum distance between the lower and the upper sleeping place, on the one hand, and between the upper sleeping place and the ceiling of the driver cab, on the other, have to be maintained for the sleeping places. However, simultaneously therewith, the seating surface of the rear seat bench to be formed should be matched approximately to the height of the seating surface of the forward seats for the purposes of a favorable seating position.

Both requirements cannot be realized without difficulties by reason of the limited space conditions in the driver cab if the height of the driver cab is not to be changed. It is proposed according to the present invention as solution to the underlying problems to pivotally secure each of two seat benches, arranged one below the other, along one of the longitudinal sides thereof with the aid of foldable double hinges at the driver cab and to selectively support the seat benches along the other longitudinal side thereof by means of securing and mounting devices mounted at the driver cab which retain the seat benches in the bed position or in a position in which the upper seat bench serves as backrest and the lower seat bench as seating surface of an additional seat bench. By the arrangement and use according to the present invention of double hinges, a double pivoting of the cushioned benches is possible which permits it to realize the desired height adjustment of the lower cushioned bench serving as seating surface after the conversion into seat bench and simultaneously also to left the upper cushioned bench in such a manner that it can adapt itself to the changed height position of the lower cushioned bench in the pivoted condition.

A particularly advantageous type of construction of the present invention results if, on the one hand, one or several straps secured at the ceiling of the driver cab are provided as securing means for the upper cushioned bench to hold the same in the sleeping position and if, on the other, abutments arranged at the rear wall of the driver cab are provided for retaining the cushioned bench pivoted in seating position thereof. In lieu of the mentioned straps or still better, in addition thereof, displaceable bolts arranged at the cushioned bench may be provided as securing means for the upper cushioned bench which are adapted to be inserted into and locked in guide means at the lateral driver cab wall for the purpose of mounting support of the cushioned bench in the sleeping position. Appropriately with this type of construction there may be provided as abutments pivotally constructed levers retained by elastic means in the pivoted-out position, on the one hand, and in the pivoted-in position, on the other, within the area of the vehicle wall which is disposed opposite the lower edge of the cushioned bench in the downwardly pivoted position; tonguelike elements may be arranged at the rear longitudinal side of the cushioned bench which engage behind corresponding projections at the driver cab wall. A safe securing of the upper cushioned bench in its position as backrest is achieved in this manner which can be adjusted during conversion by the vehicle passengers without a great deal of work.

A particularly simple type of construction of the present invention consists in that as securing means for the lower cushioned bench there are provided, on the one hand, a box arranged on the floor of the driver cab, serving preferably for the storing of blankets or the like and adapted to be closed in a coverlike manner by the lower cushioned bench in the sleeping position and, on the other, support levers adapted to be pivoted up and secured at the box which serve for the mounting support of the cushioned bench as seating surfaces which is raised with respect to the sleeping surface. For purposes of locking the lower cushioned bench in its respective position, corresponding means may be provided both at the box as well as at the support lever which are appropriately constructed respectively as a bolt provided with a head and arranged at the box and at the support lever and as strap or clip, preferably elastically constructed and arranged at the cushioned bench for the hooked engagement in the bolts.

The double hinges according to the present invention may consist of a fixed securing part mounted at the wall of the driver cab, of a center part pivotally connected with this first part by way of a hinge pin or the like and of an end part pivotally connected with the center part which is securely mounted at the respective longitudinal side of the cushioned bench. In this manner, the length of the securing part, of the center part and of the end part of a double hinge can be so matched to the desired end position of the pivotally connected end of the cushioned bench that the conversion from sleeping into seating position can be realized without difficulty.

Accordingly, it is an object of the present invention to provide a sleeping place arrangement for trucks which avoids by simple means the aforementioned shortcomings and drawbacks encountered in the prior art.

Another object of the present invention resides in a convertible sleeping place arrangement for long-distance trucks which produces two superposed sleeping places from a seat bench consisting of seating surface and backrest.

A further object of the present invention resides in a sleeping place arrangement for trucks of the type described above which requires relatively little space within the driver cab of the truck, can be converted from seating into sleeping place and vice versa with a minimum of work and provides a high degree of comfort to the persons using the same in the seated as well as sleeping position.

A still further object of the present invention resides in a convertible sleeping place arrangement for the driver cab of long-distance trucks which not only fulfills all legal requirements but assures optimum safety with minimum parts.

These and other objects, features, and advantages of the present invention will become more obvious from the following description when taken in connection with the accompanying drawing which shows, for purposes of illustration only, one embodiment in accordance with the present invention, and wherein.

Figure 1:
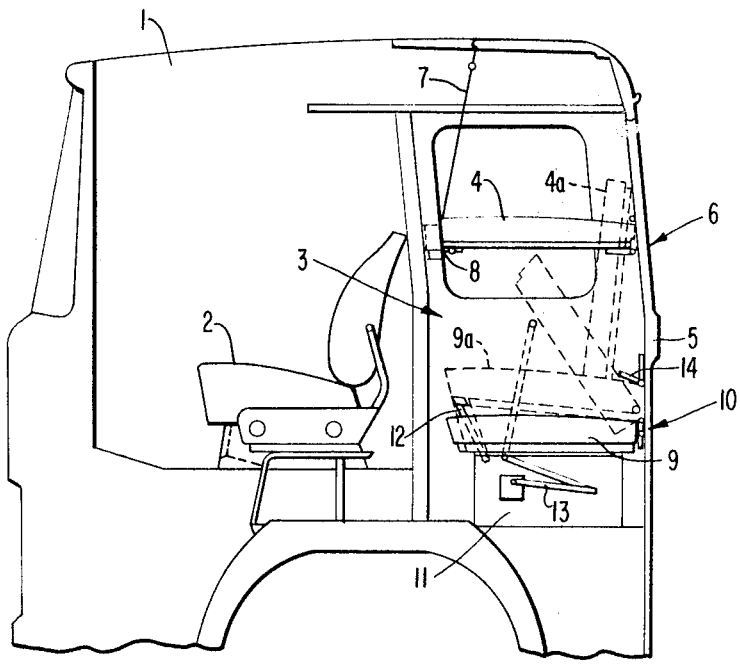
FIG. 1 is a somewhat schematic longitudinal cross-sectional view through the driver cab of a truck equipped with a double berthing arrangement in accordance with the present invention.
Figure 2:
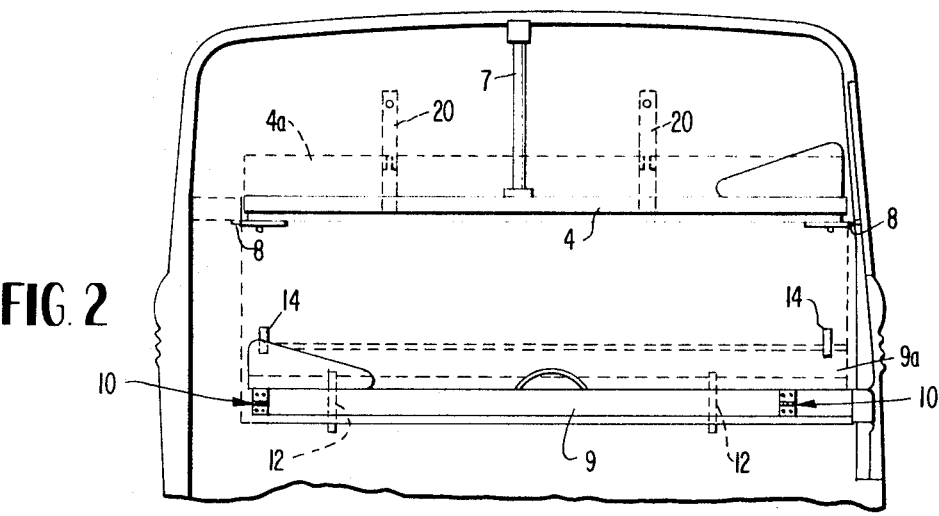
FIG. 2 is a somewhat schematic transverse cross-sectional view through the driver cab of FIG. 1.

Referring now to the drawing wherein like reference numerals are used throughout the various views to designate like parts, and more particularly to FIGS. 1 and 2, an adjustable driver seat 2 is arranged within a driver cab 1 behind which, preferably at least separated in part by a partition wall, is provided an additional space generally designated by reference numeral 3 for the accommodation of sleeping places for the assistant drivers. As indicated in the full-line position, an upper cushioned bench 4 which is equipped in a conventional manner as known for berths, is secured in the sleeping position within the driver cab along its rear longitudinal side with the aid of a double hinge generally designated by reference numeral 6 mounted at the rear wall 5 of the driver cab and along its forward longitudinal side by way of a strap 7 secured at the ceiling of the driver cab 1 as well as by way of two lateral bolts 8 adapted to be inserted into and locked in corresponding guide means at the lateral walls of the driver cab. At the legally prescribed distance below the upper cushioned bench 4, a second cushioned bench 9 is secured with its rear longitudinal side at the vehicle wall 5 by way of the double hinge generally designated by reference numeral 10. This cushioned bench 9 rests securely in the position illustrated in full line on the box 11 arranged below the bench 9 and preferably serving for the accommodation and storing of bed blankets, etc. and is latched in this position by corresponding means to be described more fully hereinafter by reference to the other FIGS. In this position, the bench 9 serves simultaneously as cover for the box 11 and closes the same. It can be pivoted up about its rear longitudinal side for the removal of the contents of the box 11 and can be retained by conventional support levers 13 in the pivoted-up position as indicated in dash lines.

If the thus-created double berthing arrangement is to be converted into an additional seat bench, then it is not sufficient to pivot the upper bench 4 downwardly because the seating surface of the lower cushioned bench 9 would be too low with respect to the seating surface of the driver seat 2 which would have as a consequence an unfortunate seating position for the persons seated thereon by reason of the slight distance from the driver cab floor. For this reason, the lower bench 9 and the double hinge 10 are pivoted into the position 9a indicated in dash line (FIG. 2) while the lower bench 9 is secured in a favorable seating position at its forward end by support levers 12 pivotally mounted at the box 11. For the purpose of adaptation to the changed height position of the lower cushioned bench 9a in the seating position, the upper cushioned bench 4 can also be pivoted into the position 4a with the aid of the double hinge 6 as can also be seen in greater detail from FIGS. 3 and 3a. In this position 4a, the upper cushioned bench is retained, on the one hand, by the lower bench 9a and, on the other, by the abutment 14 (FIGS. 1, 2 and 6) in the position, in which it serves as backrest for the seat bench constituted by the cushioned benches 9a and 4a.

Figure 3:
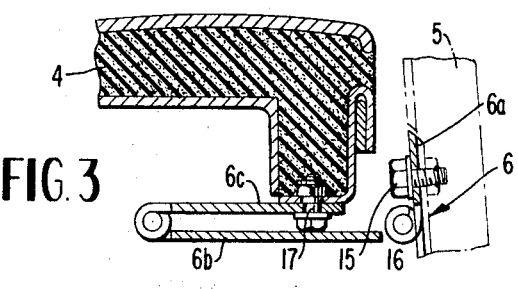
FIG. 3 is a partial cross-sectional view, on an enlarged scale, through the double hinge according to the present invention for the upper cushioned bench in the sleeping position.
Figure 3A:
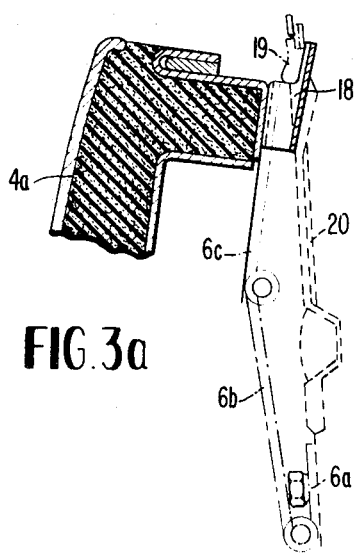
FIG. 3a is a partial cross-sectional view through the double hinge of FIG. 3, however, in the pivoted position of the upper cushioned bench as backrest of the seat bench.

It can be readily seen from FIG. 3 that the double hinge 6 consists of a securing section 6a which is secured with the aid of one or several screws 15 at the rear wall 5 of the driver cab 1. The center section 6b of the double hinge is connected with the securing section 6a by way of the hinge bolt 16, while the end section 6c is pivotally connected with the center section 6b whereby the end section 6c is again secured by one or several screws 17 at the cushioned bench 4. As can be seen from FIG. 3a, the section 6b of the double hinge 6 and the section 6c are pivoted up when the bench assumes its position 4a as backrest of the seat bench.

In order to secure the position of the cushioned bench 4a, tonguelike elements 18 (FIG. 3a) are additionally secured at the rear, longitudinal edge of the bench 4a which engage behind corresponding projections 19 of fittings 20 that are secured at the vehicle wall 5. The tonguelike elements 18 can be inserted behind the corresponding projections 19 during the pivoting back of the lower forward edge of the bench 4a toward the abutments 14 illustrated in FIG. 1.

Figure 4:
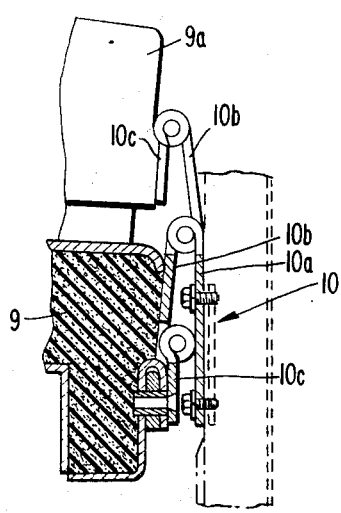
FIG. 4 is a partial cross-sectional view, on an enlarged scale, through the double hinge according to the present invention for the lower cushioned bench in the sleeping position, on the one hand, and also the pivoted condition in the seating position.

It can be seen from FIG. 4 that also the double hinge 10 consists of a securing section 10a, of a center section 10b and of an end section 10c secured at the cushioned bench 9. In the berthing position of the bench 9, the center section 10b and the end section 10c are opposite the securing section 10a. In order to bring the cushioned bench into its seating position 9a, the center section 10b is pivoted up, as indicated in FIG. 1 in dash line. As a result thereof, the height position of the bench 9a is changed in the desired manner.

Figure 5:
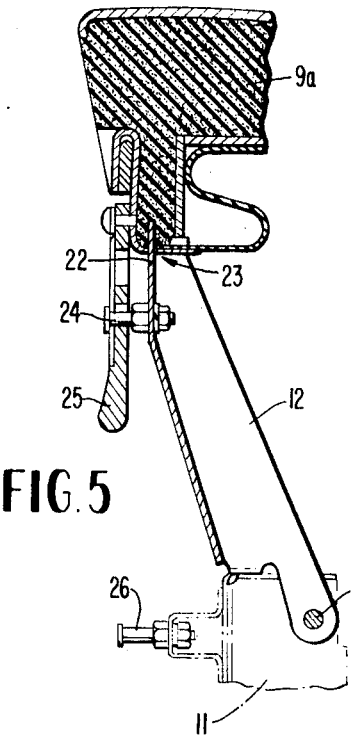
FIG. 5 is a partial cross-sectional view, on an enlarged scale, through the support lever provided for the lower cushioned bench in the seating position.

It can be seen from FIG. 5 that for purposes of supporting the front edge of the bench 9a in the seating position, two support levers 12 resting on the box 11 and pivotally supported with respect thereto by way of bolts 21 are provided which are guided with their upper end 22 partly within the bench 9a but which abut with their upper boundary surface 23 against the bottom side of the cushioned bench 9a. A bolt 24 is secured at the support lever 12 into which is hooked a clip or strap 25, preferably consisting of elastic material, for example, of rubber and secured at the bench 9a. As a result thereof, the position of the bench 9a on the support level 12 is secured.

If the bench 9a is to be lowered into its berthing position 9, then after unhooking the clips or straps 25 and after pulling out the end 22 out of the guide means in the bench 9a, the support lever 12 is pivoted down in the clockwise direction. The cushioned bench 9 can then rest on the upper edge of the box 11 and is again latched with the aid of the clip or strap 25 at the bolts 26 provided at the box 11.

Figure 6:
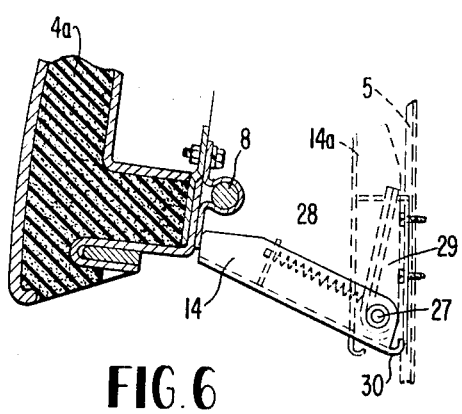
FIG. 6 is a partial cross-sectional view, on an enlarged scale, through the pivot lever constructed as abutment for the mounting support of the upper bench in its position as backrest.

It can be seen from FIG. 6 that the upper cushioned bench 4a pivoted into its seating position is kept in its inclined position desired for the seating position by an abutment lever 14. The lever 14 is thereby pivotally supported at the rear wall 25 of the driver cab by way of the bolt 27. The compression spring 28 which is supported with its right end in the mounting means 29 secured at the driver cab wall 5, presses the lever 14, in the position thereof shown in full line, downwardly in the counterclockwise direction and retains the same in this pivoted position, in which the lever 14 abuts with an abutment 30 at its right lower end at the housing wall. If the lever 14 is pivoted up in the clockwise direction for the conversion into the sleeping arrangement, then the compression spring 28 reaches a point in which its force action exerts no longer any moment on the lever 14. If the lever 14 is further pivoted in the clockwise direction beyond this point, then the spring 28 commences to press the lever 14 into its position 14a in which it abuts against the vehicle wall 5.

Thus, an advantageous sleeping arrangement is produced by the present invention which permits under the utilization of the predetermined space in a driver cab, both the arrangement of two sleeping places as well as also of an additional seat bench.

While we have shown and described only one embodiment in accordance with the present invention, it is understood that the same is not limited thereto but is susceptible of numerous changes and modifications as known to a person skilled in the art, and we therefore do not wish to be limited to the details shown and described herein.

We claim:

1. A sleeping arrangement for trucks which includes within the driver cab, seat means for the driver seat and possibly for an assistant driver and bench means arranged behind the seat means and serving as berthing means, characterized in that the berthing means comprises two cushioned bench means arranged one below the other, and means for securing said bench means either in a sleeping position or in a seating position including vertically spaced foldable double hinge means secured at a wall of the driver cab pivotally securing the bench means at the driver cab along one side thereof and securing means at the opposite side of said bench means for selectively supporting the bench means at the driver cab in said sleeping position or in said seating position, the upper bench means serving in said seating position as backrest and the lower bench means as seating surface of an additional seating bench disposed in said driver cab to the rear of said seat means.

2. An arrangement according to claim 1, wherein the double hinge means are secured at the rear wall of the driver cab and include a securing station rigidly secured at the driver cab wall, a center section pivotally connected with the first-mentioned securing section by way of a hinge bolt and an end section pivotally connected with the center section and secured at the corresponding side of the respective bench means.

3. An arrangement according to claim 1, wherein said securing means includes at least one strap means secured at the ceiling of the driver cab for holding the upper bench means in the sleeping position, and abutment means arranged at the rear wall of the driver cab for holding the upper bench means folded in the seating position thereof, bolt means are provided as securing means for the upper bench means, said bolt means being slidably arranged at said upper bench means and being operable to be inserted into and locked in guide means at the lateral driver cab wall for holding the upper bench means in the sleeping position, and further comprising abutment means including pivotal lever means and spring means for holding said lever means both in a pivoted-out position where said upper bench means abuts thereagainst in the seating position and a pivoted-in position which are located within the area of the vehicle rear wall disposed opposite the forward side of the bench means in the seating position, and means provided at the rear side of the bench means which engage behind corresponding projection means provided at the driver cab wall.

4. An arrangement according to claim 3, wherein the spring means includes a spring secured eccentrically to the pivot point of the lever means and pressing against the last-mentioned abutment means, the spring assuming its dead center position between the pivoted-in and pivoted-out position of said abutment means.

5. An arrangement according to claim 3, wherein the securing means for the lower bench means includes box means arranged on the floor of the driver cab and adapted to be closed in a covered manner by the lower bench means in the sleeping position, and support lever means secured at the box means and adapted to be pivoted up which serve for the support of the lower bench means in its position as seating surface.

6. An arrangement according to claim 5, wherein both said box means as well as said support lever means include means for locking the lower bench means in its respective positions.

7. An arrangement according to claim 6, wherein said locking means includes bolt means having a head portion, and strap means at said bench means to be engaged in the bolt means.

8. An arrangement according to claim 7, wherein said strap means are elastically constructed.

9. An arrangement according to claim 7, wherein said double hinge means include a securing section rigidly secured at the driver cab wall, a center section pivotally connected with the first-mentioned securing section by way of a hinge bolt and an end section pivotally connected with the center section and secured at the corresponding side of the respective bench means.

10. An arrangement according to claim 1, wherein bolt means are provided as securing means for the upper bench means, said bolt means being slidably arranged at said upper bench means and being operable to be inserted into and locked in guide means at the lateral driver cab wall for holding the upper bench means in the sleeping position.

11. An arrangement according to claim 1, further comprising abutment means including pivotal lever means and spring means for holding said lever means both in a pivoted-out position where said upper bench abuts thereagainst in the seating position and a pivoted-in position which are located within the area of the vehicle rear wall disposed opposite the forward side of the bench means in the seating position, and means provided at the rear side of the bench means which engage behind corresponding projection means provided at the driver cab wall.

12. An arrangement according to claim 11, wherein the spring means includes a spring secured eccentrically to the pivot point of the lever means and pressing against the last-mentioned abutment means, the spring assuming its dead center position between the pivoted-in and pivoted-out position of said abutment means.

13. An arrangement according to claim 11, wherein said securing means includes at least one strap means secured at the ceiling of the driver cab for holding the upper bench means in the sleeping position, and abutment means arranged at the rear wall of the driver cab for holding the upper bench means folded in the seating position thereof.

14. An arrangement according to claim 1, wherein the securing means for the lower bench means includes box means arranged on the floor of the driver cab and adapted to be closed in a covered manner by the lower bench means in the sleeping position, and support lever means secured at the box means and adapted to be pivoted up which serve for the support of the lower bench means in its position as seating surface.

15. An arrangement according to claim 14, wherein both said box means as well as said support lever means include means for locking the lower bench means in its respective positions.

16. An arrangement according to claim 15, wherein said locking means includes bolt means having a head portion, and strap means at said bench means to be engaged in the bolt means.

17. An arrangement according to claim 16, wherein said strap means are elastically constructed.